Figure 1:
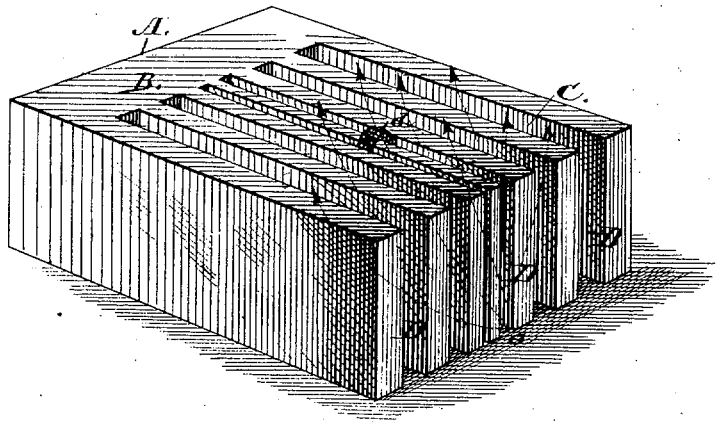

BEST AVAILABLE COPY

J. D. HUSBANDS, Jr.

Fire-Kindlers.

No. 6,246. Reissued Jan. 19, 1875.

Witnesses:

A. H. Norris.

Geo. W. Cushing jr

Inventor.

Joseph D. Husbands jr.

By James L. Norris.

Atty.

THE GRAPHIC CO. PHOTO-LITH. 39 & 41 PARK PLACE, N.Y.

UNITED STATES PATENT OFFICE.

JOSEPH D. HUSBANDS, JR., OF ST. LOUIS, MISSOURI, ASSIGNOR TO THE AMERICAN FIRE-KINDLER COMPANY, OF SAME PLACE.

IMPROVEMENT IN FIRE-KINDLERS.

Specification forming part of Letters Patent No. 154,796, dated September 8, 1871; reissue No. 6,246, dated January 19, 1875; application filed January 12, 1875.

*To all whom it may concern:*

Be it known that I, JOSEPH D. HUSBANDS, Jr., of St. Louis, in the county of St. Louis and State of Missouri, have invented certain Improvements in Fire-Kindlers, of which the following is a specification:

This invention relates to a new and improved fire-kindler, being designed to furnish a cheap and efficient substitute for the ordinary split-wood kindling, and dispensing with the use of shavings, paper, and like material, the only requisite essential for starting a flame being to apply a lighted match or taper directly to the material constituting the kindler.

This invention consists in forming a fire-kindler from a block of wood, constructed with a series of draft flues or openings for admitting the draft into or through the block for intensifying the heat, and obviating smothering of the flame, said constructed block being coated or saturated with an inflammable material to insure ease, rapidity, and certainty of combustion, in such a manner that it may be readily ignited without the aid of paper or shavings, and kindled into a powerful blaze, capable of igniting the fuel employed or brought in contact with it, the air-passages or draft-flues serving to admit oxygen or air to the interior of, or through, the block, whereby will be generated or created an intense heat, insuring a rapid and perfect combustion, said block by such being converted into burning charcoal. The draft impelling the flame against it generates an intense heat, as well as securing a bed of coals as a basis for the fuel, the combustion of the material forming the block and the intense heat secured being due to the presence of the air-passages or draft-flues, and by the presence of such rendering it impossible to be smothered by fuel or otherwise.

The invention further consists of the combination, in a fire-kindler, of a block of wood constructed with draft-flues or partitions varying in size, for admitting draft into or through the block to intensify the heat, and secure gradual combustion and rapid ignition of the kindler, the draft-flues and the partitions being formed in the block by cutting-tools.

The invention further consists in constructing a fire-kindler of a block with a series of partitions, between each of which intervenes an air-passage or draft-flue for admitting oxygen or draft freely to the interior of, or through, the block, whereby is generated an intense heat and large flame, securing a gradual perfect combustion of the material of which the kindler is constructed, an igniting-wick being combined with such flued fire-kindler as to provide a ready means for starting a flame.

Figure 2:
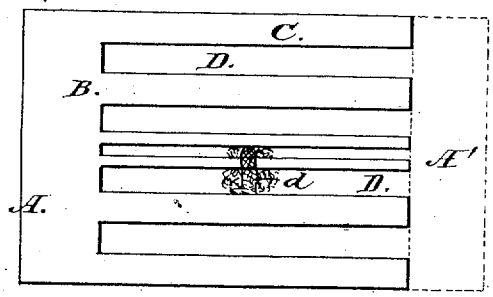
Figure 3:
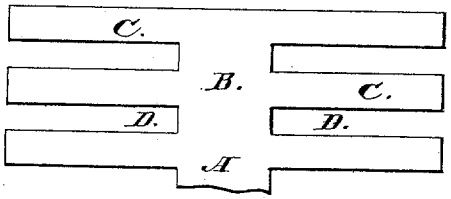

In the drawings, Figure 1 is a perspective view of my improved fire-kindler, illustrating the air-passages or draft-flues, the arrows indicating the course of the flame into or through the kindler. Fig. 2 is a top or plan view of the same. Fig. 3 illustrates my invention with partitions emanating from either side of a solid head or center to form air-passages or draft-flues.

Referring to the drawings, the letter A designates a fire-kindler, consisting of a solid head or body, B, with which is constructed a series of partitions, C, formed in such a manner, and in such respect to each other, as to create air-passages or draft-flues D, in such a manner that, when the front of the partitions are lighted, and the kindlers placed upon a fire-grate, or in any other desired spot, the air-passages or draft-flues will conduct the draft and flame from the front toward the head or body of the kindler through the flues, and escape through the air-passages and draft-flues at the top, if the kindler is placed upon a fire-grate in the position illustrated in Fig. 1; or such flame will escape at the sides through the air-passages or draft-flues, if the solid portion of the block is placed uppermost.

In the blocks, as thus constructed, it will be noticed that a series of air-passages or draft-flues, D, are present, the same being formed between partitions emanating from a head or body, B, which said head or body is of sufficient thickness and bulk as to prevent splitting or separating while the blocks are being dipped, packed, or burned.

The blocks are preferably prepared from the refuse pieces of wood which accumulate in great quantities around lumber-mills by making such pieces into slabs or blocks of suitable size, the air-passages or draft-flues being constructed by feeding or bringing the blocks to or in contact with a gang of cutting-tools of proper size.

Figure 4:
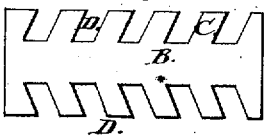
Figure 5:
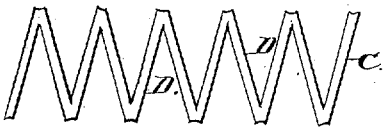

If desirable, the head or body may be centrally formed or located, as illustrated in Figs. 3 and 4, or a cross-head may be constructed or formed at each end, as illustrated by the dotted lines at A′, Fig. 2; or straight strips partially broken, as illustrated in Fig. 5, may be substituted to form my improved flued fire-kindler; but the single-headed strip illustrated in Figs. 1 and 2, when constructed with air-passages or draft-flues, is the most desirable and economical construction. The blocks or strips thus formed are saturated, impregnated, or coated with an inflammable material, such as petroleum, rosin, or paraffine, &c.

When rosin, which is solid at ordinary temperatures, is used, it should be made quite hot, so as to penetrate the substance composing the blocks, and by such secure a proper requisite saturation and impregnation, care being exercised not to deposit too thick a coating on the outside, as such would have a tendency to obstruct the air-passages or draft-flues, and hence prevent the block from rapidly kindling by obstructing the free entrance of oxygen or air to the interior of or through the block.

In order to facilitate the lighting of the block an igniting-wick, *d*, formed of gunny, burlaps, cotton-waste, or equivalent material, can be combined with the kindler, and such may be inserted between two of the partitions of the block before supplying the same with the inflammable material, said wick, in such instance, being held in place by the setting or solidification of the saturating or impregnating inflammable agent employed.

The partitions or the air-passages or draft-flues should either or both be of varying size, for the purpose of facilitating rapid ignition by a torch or match when applied thereto, so as to insure a more certainty of perfect ignition and gradual combustion, and, further, to present a fire-kindler suitable for igniting fuel requiring different degrees of heat.

Blocks of wood have been impregnated with hydrocarbons for the purpose of securing ignition and combustion of the same, and to effect such impregnation said blocks have been provided with a slit or slot, so that the hydrocarbon could enter such slit and permeate the block.

A block having such a single slit for the conduct of hydrocarbons into the interior of the same does not produce a fire-kindler capable of securing the results attained by my invention, as the block, not being supplied with draft-flues, will burn principally on the outside, and hence lie smoldering without generating sufficient heat to ignite the fuel.

These objections are obviated by my invention, because I construct the block with a series of thin partitions to form a series of draft-flues, the practical result being ease of ignition and rapidity of combustion; and, further, the presence of the draft-flues admit draft into or through the block for supporting combustion, generating an intense heat around and through the flues, producing charcoal, and a flame incapable of being smothered, so that fuel applied thereto will be readily ignited.

Having thus described my invention, what I claim, and desire to secure by Letters Patent, is—

1. A fire-kindler made from a block of wood, constructed with a series of draft-flues created by thin partitions, for admitting the draft into or through the block to intensify the heat, and to obviate smothering of the flame.

2. The combination, in fire-kindlings, of a block possessing a head or body with a series of partitions to form a series of air-passages or draft-flues saturated or impregnated with an inflammable material agent.

3. In a fire-kindler, a block of wood combined with draft-flues or partitions varying in size, for admitting draft into or through the block, to intensify the heat and secure gradual combustion and rapid ignition of the kindler, substantially as described.

4. The combination of an igniting-wick with a fire-kindler constructed of a block of suitable material, having a series of draft-flues for admitting draft into or through the block, substantially as described.

JOSEPH D. HUSBANDS, Jr.

Witnesses:
James L. Norris,
Geo. W. Cushing, Jr.